(12) United States Patent
Adams

(10) Patent No.: US 8,714,792 B2
(45) Date of Patent: May 6, 2014

(54) LIGHT BAR AND BUMPER

(75) Inventor: James H. Adams, Jasper, AL (US)

(73) Assignee: Fontaine Trailer Company, Inc., Haleyville, AL (US)

( * ) Notice: Subject to any disclaimer, the term of this patent is extended or adjusted under 35 U.S.C. 154(b) by 389 days.

(21) Appl. No.: 12/702,014

(22) Filed: Feb. 8, 2010

(65) Prior Publication Data

US 2010/0202150 A1 Aug. 12, 2010

Related U.S. Application Data

(60) Provisional application No. 61/150,676, filed on Feb. 6, 2009.

(51) Int. Cl.
*B60Q 1/00* (2006.01)

(52) U.S. Cl.
USPC ........... 362/505; 362/495; 362/496; 362/497; 362/498; 362/499; 362/506; 362/540; 362/541; 362/542; 362/543; 362/544; 362/545; 362/546; 362/547; 362/548; 362/549

(58) Field of Classification Search
USPC .................................................. 362/459–549
See application file for complete search history.

(56) References Cited

U.S. PATENT DOCUMENTS

| | | | | |
|---|---|---|---|---|
| 2,231,312 A | * | 2/1941 | Ache | 362/505 |
| 2,231,313 A | * | 2/1941 | Ache | 362/549 |
| 3,691,366 A | | 9/1972 | Spreuer | |
| 5,062,027 A | | 10/1991 | Machida et al. | |
| 5,119,278 A | | 6/1992 | Watson | |
| 5,871,270 A | | 2/1999 | Ricker et al. | |
| 6,520,669 B1 | | 2/2003 | Chen et al. | |
| 7,347,597 B2 | | 3/2008 | French | |
| 2005/0105296 A1 | * | 5/2005 | French | 362/485 |
| 2007/0223242 A1 | | 9/2007 | Blades et al. | |

FOREIGN PATENT DOCUMENTS

DE 1091885 10/1960

OTHER PUBLICATIONS

International Search Report and Written Opinion issued Apr. 14, 2010 in corresponding International Application No. PCT/US10/23505.
"Light Bars—Stainless Steel," found at http://openroadaccessories.com/itempages/lightbars.php, printed on Oct. 3, 2008, 2 pages.
"One Piece Light Bar," found at http://thekingofchrome.com/sc.asp?scid=prd&catid=52, printed on Sep. 30, 2008, 1 page.
"One Piece Rear Light Bar wih 4" Round Lights," found at http://www.iowa80.com/DirectionsWEB/webcart_productDisplay.php?itemid=81980, printed on Sep. 30, 2008, 1 page.
"TrucknTow Economy Wide Load Light Bar," found at http://www.truckntow.com/pc-10982-147186-truckntow-economy-wide-load-light-bar.aspx, printed on Oct. 3, 2008, 1 page.

* cited by examiner

*Primary Examiner* — William Carter
(74) *Attorney, Agent, or Firm* — R. Blake Johnston; DLA Piper LLP US

(57) ABSTRACT

A bumper adapted for mounting to a trailer is provided. The bumper comprises a tail skirt extending horizontally across the rear of the trailer. Upright bars mount to and intersect the tail skirt. The tail skirt comprises a groove for receiving a recessed light bar comprising multiple signal lights. The wiring harness extends from the light bar into a space behind the upright bars and passes through openings in the tail skirt behind the upright bars.

12 Claims, 6 Drawing Sheets

US 8,714,792 B2

LIGHT BAR AND BUMPER

RELATED APPLICATIONS

This application is a continuation of and claims priority to U.S. provisional Application Ser. No. 61/150,676, filed Feb. 6, 2009, titled "Light Bar for Trailer," which is incorporated herein by reference.

FIELD OF THE INVENTION

The present invention is related to a trailer, and more specifically, to a light bar combining multiple signal lights into one housing, typically recessed in the bumper of a vehicle.

BACKGROUND AND SUMMARY

The present disclosure consists of a light bar installed on the rear bumper of a vehicle such as a tractor trailer to provide the light signals required by law in one integrated bar. Conventional trailers have three separate lights on each end of the rear bumper, and a separate side marker light is generally required to illuminate the rear side of the trailer. Three separate wiring harnesses and three openings in the bumper were required for receiving the separate lights.

The light bar of the present disclosure is a one-piece integrated assembly with one wiring harness that incorporates multiple lights in a single waterproof enclosure. The brake light(s), turn signal, and side marker light are all enclosed within the assembly. Further a forward light reflector throws light forward so that the driver can see the rear of the trailer via the rear view mirror.

The light bar eliminates the separate connections required for each of the lights previously used, while also eliminating the need for extra protection devices (covers, boxing, etc). The electrical connection between the light bar and the trailer is located inboard of the chassis frame, unlike conventional trailer lights in which the connection is behind the trailer tires.

The trailer bumper is specially designed with a groove or channel to receive the light bar so that the light bar is recessed into the bumper and is thus protected from impact. LEDs provide the light sources for the light bar.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The foregoing and other features of the invention will become more apparent upon a consideration of the following description taken in connection with the accompanying drawings wherein.

DETAILED DESCRIPTION

Figure 1:
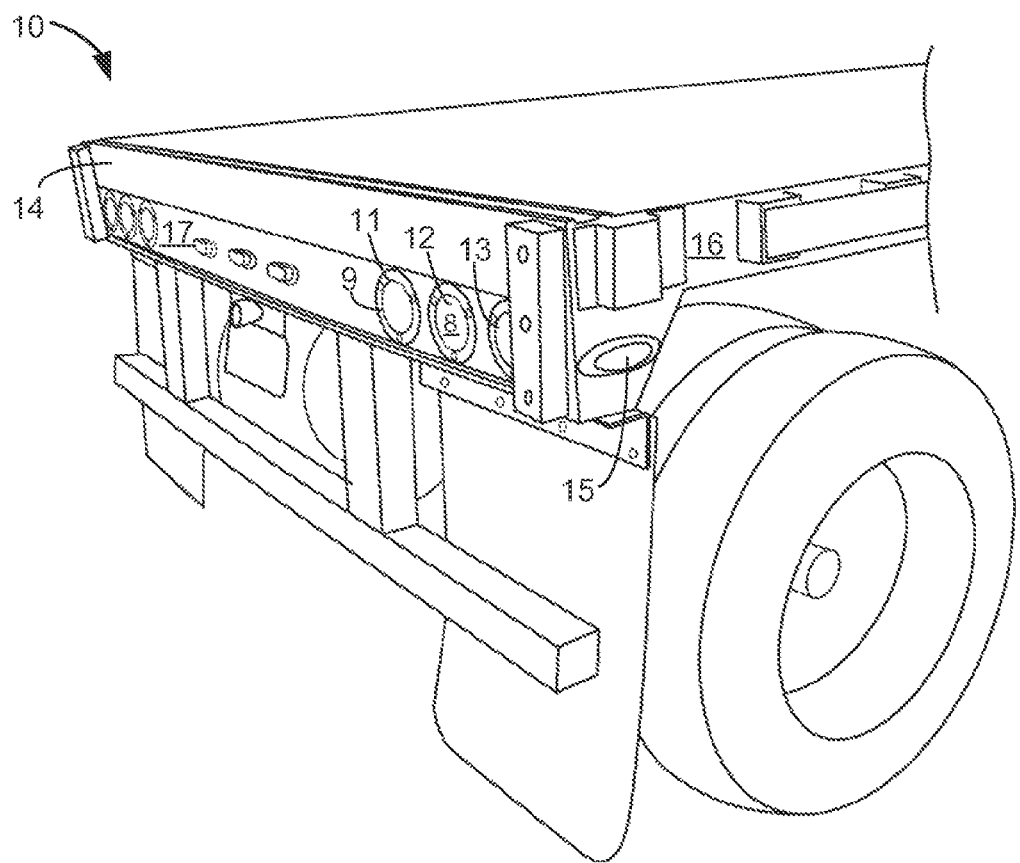
FIG. 1 is a perspective view of a prior art bumper and light arrangement.

FIG. 1 illustrates a conventional prior art trailer 10 having three separate lights 11, 12, and 13 on each end of a rear bumper 14. The lights 11 and 12 are generally brake lights and light 13, the outermost light, is a turn signal light. Although only the three lights 11-13 on the right end of the bumper 14 are labeled in FIG. 1, the left end of the bumper 14 is substantially similar to the right end.

Each light 11-13 is comprised of a light bulb (not shown), a reflective light cover 9, and a backing plate 8. The backing plate 8 fits over the light cover 9 and fasteners (not shown) affix the backing plate to the bumper 14.

Three separate wiring harnesses (not shown) and three openings (not shown) in the bumper 14 are required for receiving the lights 11-13. The lights 11-13 are generally flush with or protrude from the vertical surface 17 of the bumper 14. The lights 11-13 are thus susceptible to damage from rear end collisions or in normal operations such as backing into docks.

The trailer 10 further comprises a separate side marker light 15 that marks the rear side 16 of the trailer 10. The side marker light 15 also comprise separate wiring harnesses and separate openings in the side 16 of the trailer 10. Note that the opposite side of the trailer is substantially similar in that it comprises a side marker light (not shown).

Figure 2:
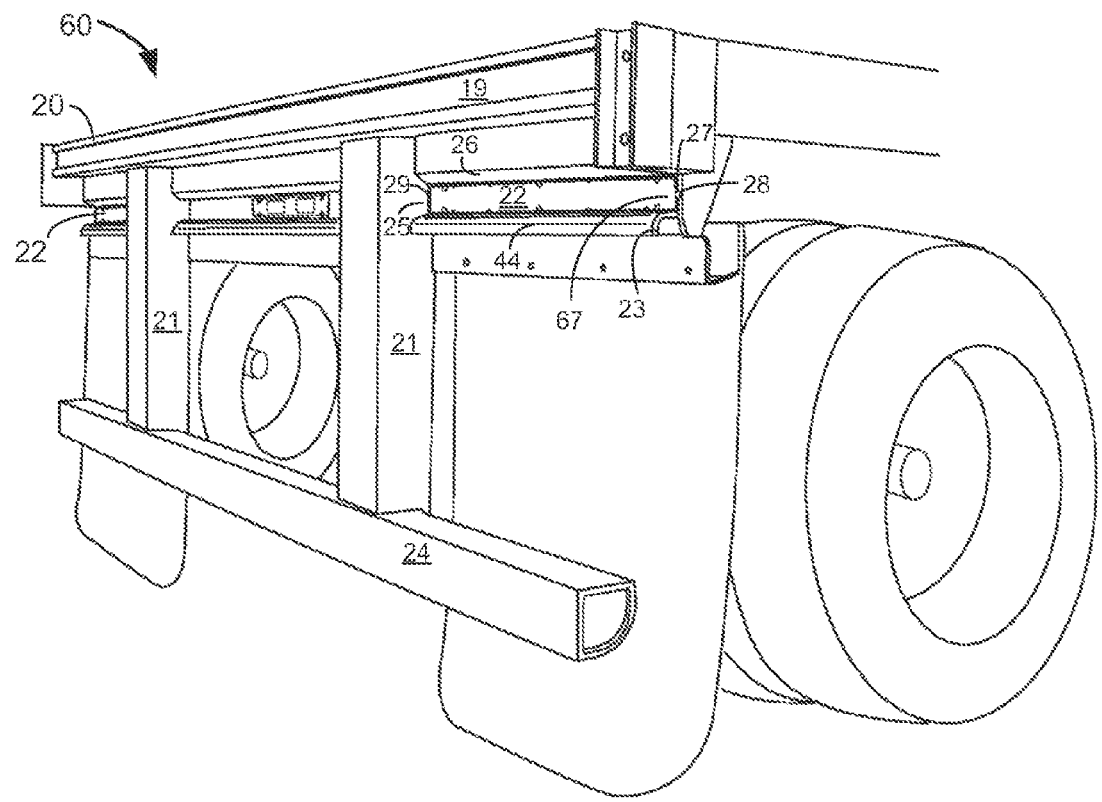
FIG. 2 is a perspective view of a light bar and bumper according to an embodiment of the present disclosure.

FIG. 2 illustrates a trailer 60 with a bumper 20 according to an embodiment of the present disclosure. The bumper comprises two uprights 21 extending downwardly from a horizontal tail skirt 19 and terminating in a rear step 24. The horizontal tail skirt 19 is comprised of extruded aluminum in one embodiment.

The bumper 20 comprises a plurality of light bars 22. Two (2) light bars 22 are shown in the illustrated embodiment, one each on opposed ends of the tail skirt 19. The light bars 22 are recessed into a generally horizontal groove 25 that is formed in the tail skirt 19. The groove 25 is deep enough that when the light bar 22 is installed, the outer surface of the light bar 22 is recessed from the flange 44 and upper lip 26 of the tail skirt 19, as further discussed herein. Thus the light bar 22 is generally protected from damage from collisions affecting the bumper 20.

The light bars 22 are disposed between the bumper uprights 21 and the edges 23 of the bumper 20. Each light bar 22 is connected to the tail skirt 19 via a plurality of fasteners 30 that are received by openings (not shown) in the light bar 22 and in the tail skirt 19. Although not shown in FIG. 2, the light bar 22 has a single wiring connection (not shown) at its inner side edge 29. The wiring (not shown) for the light bar 22 exits the inner side edge 29 of the light bar 22 and passes through an opening (not shown) in the bumper 20 behind the bumper upright 21, as further discussed herein. The location of the wiring passing behind the bumper upright 21 protects the wiring from impact by outside objects.

The outside end 67 of the light bar 22 extends to an outside edge 27 of the tail skirt 19, and in some embodiments, extends beyond the edge of the tail skirt 19. A forward light reflector 28 on the outside end 67 of the light bar 22 protrudes from the light bar 22 and reflects light (not shown) forward, toward the front of the trailer (not shown). The light can then be seen by a driver (not shown) via a rear view mirror (not shown). The forward light reflector 28 thus acts as and may take the place of a side marker light 15 (FIG. 1) on a conventional trailer.

Figure 3:
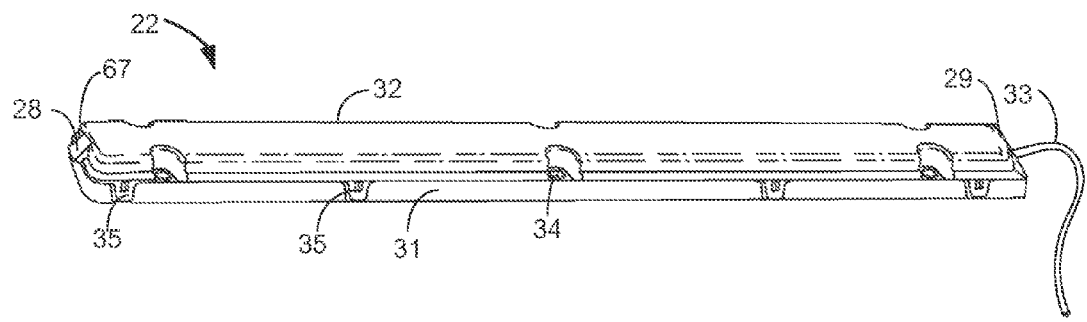
FIG. 3 is a perspective view of the light bar of FIG. 2.

FIG. 3 depicts a light bar 22 according to an embodiment of the present disclosure. The light bar 22 comprises an elongated generally rectangular housing 31 and a cover 32 that affixes to the housing 31. In one embodiment, the housing 31 and the cover 32 are fabricated from plastic. Other materials may be used in other embodiments.

The cover 32 is translucent such that light (not shown) from lights (not shown) within the light bar 22 emanates through the cover 32. In this regard, the light bar 22 comprises a plurality of light-emitting diodes (LEDs) (not shown) that illuminate when powered and shine through the cover 32. The LEDs and the cover 32 are arranged such that the resultant light pattern seen by the user (not shown) when the light bar 22 is activated is in the pattern of brake and signal lights. In other words, although the light bar 22 is a one-piece unit, the lights shining through the cover of the light bar 22 form the image of separate brake lights and a turn signal light.

Further, the forward light reflector 28 is disposed on the outside end 67 of the light bar 22. The forward light reflector 28 reflects light emanating through the cover 32 forward, toward the front of the trailer (not shown), as discussed further herein with respect to FIG. 4.

The cover 32 is affixed to the housing 31 via a plurality of friction clips 35. One or more seals (not shown) are disposed between the cover 32 and the housing 31 to keep the lights (not shown) within the housing 31 substantially dry (i.e., creates a substantially watertight enclosure). A wiring harness 33 passes through an inside end 29 of the light bar 22 and provides power to the lights (not shown) within the light bar 22.

The light bar 22 is affixed to the bumper (not shown) via a plurality of fasteners (not shown). The fasteners pass through a plurality of openings 34 in the housing 31 of the light bar 22 and are secured to the bumper.

Figure 4:
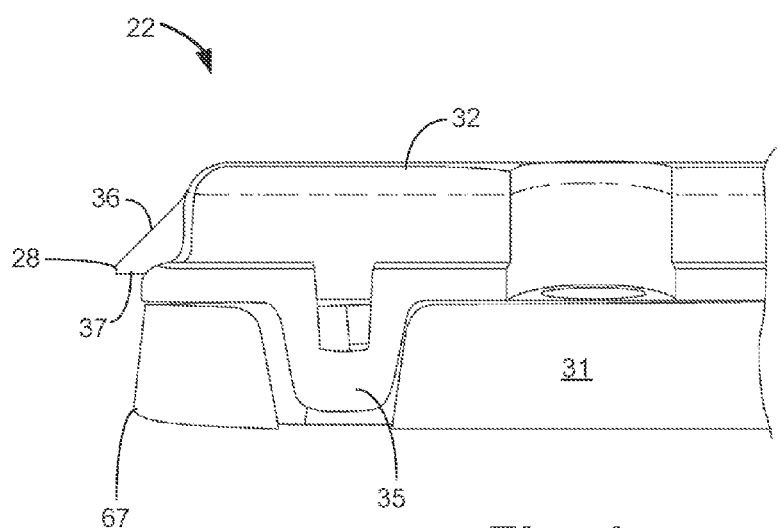
FIG. 4 is an enlarged side view of an outside end of the light bar of FIG. 3.

FIG. 4 is an enlarged view of the outside end 67 of the light bar 22. The forward light reflector 28 protrudes from the cover 32 and is integrally formed with the cover 32. The forward light reflector 28 comprises a forward-facing surface 37 and an angled prism 36. The forward-facing surface 37 is generally flat and smooth and is generally perpendicular to the sides of the trailer (not shown). The operation and configuration of the forward light reflector 28 is further discussed below with respect to FIG. 5.

Figure 5:
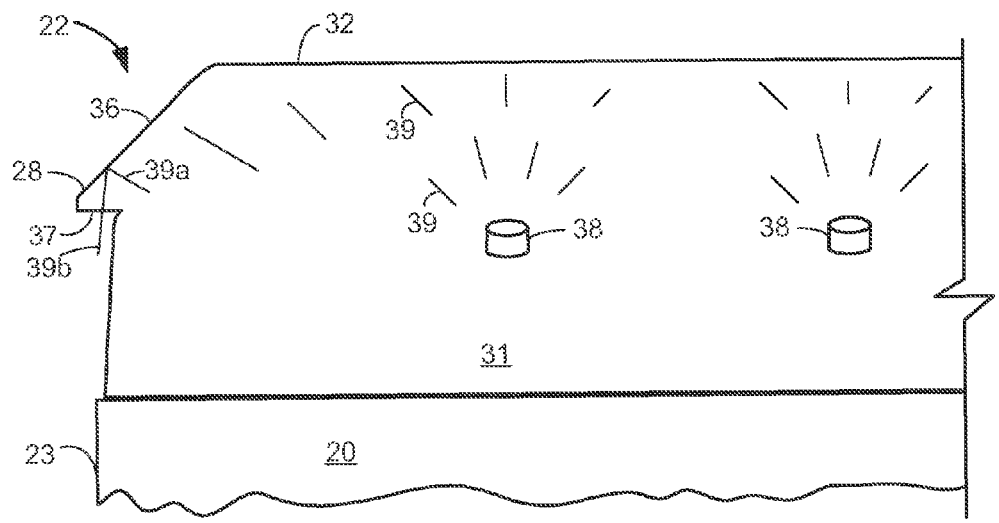
FIG. 5 is a functional representation of a light bar according to the present disclosure.

FIG. 5 is a functional representation the forward light reflector 28 of the light bar 22. In this embodiment, the light bar 22 is attached to the edge 23 of the bumper 20 such that the forward light reflector 28 extends beyond the edge 23 of the bumper 20. A plurality of lights 38 are disposed within the light bar 22 and emit light represented by reference number 39 when activated. Light represented by reference number 39a strikes the angled prism surface 36 and is reflected toward the front of the trailer (not shown) as light represented by reference number 39b. In this regard, the light reflects off of the prism surface 36, which is smooth and polished, and passes through the forward-facing surface 37. The angle between the prism surface 36 and the forward-facing surface 37 is about 45 degrees in one embodiment, though other angles are used in other embodiments.

Figure 6:
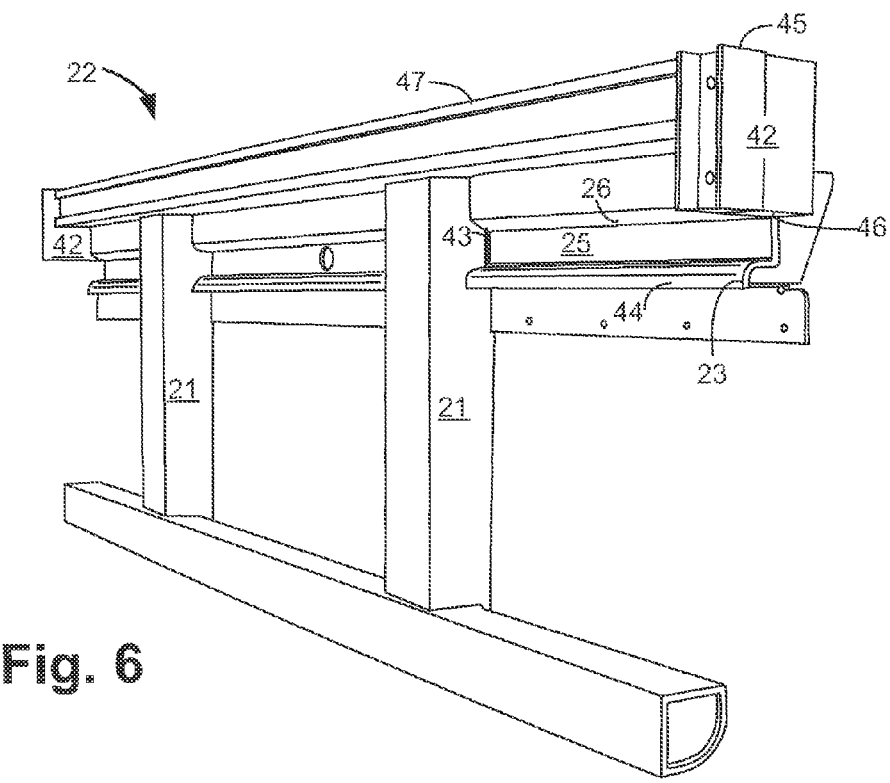
FIG. 6 is a perspective view of the bumper of FIG. 2, before the light bar is installed.

FIG. 6 depicts an embodiment of the bumper 20 before the light bars 22 (FIG. 2) are installed. The tail skirt 19 is comprised of a unitary piece of extruded metal, such as aluminum. The groove 25 that receives the light bar 22 (FIG. 2) is formed in the tail skirt 19 between the flange 44 and the upper lip 26.

A space 43 is disposed between the upright 21 and the groove 25, and the space 43 receives the wiring harness 33 (FIG. 3) from the light bar 22 (FIG. 2) when the light bar 22 is installed. The space 43 is bounded by the groove 25 and the upright 21, as further discussed herein. End caps 42 are disposed on opposed ends of the bumper 20. The end caps 42 are welded to the tail skirt 19. A top edge 45 of the end cap 42 is generally flush with a top edge 47 of the tail skirt. A bottom edge 46 of the end cap 42 is generally flush with an upper surface 48 of the groove 25.

In the illustrated embodiment, it is important that the end cap 42 does not extend into the groove 25. This is important so that the end cap 42 does not obstruct the light (not shown) reflected forward from the forward light reflector 28 (FIG. 2).

Figure 7:
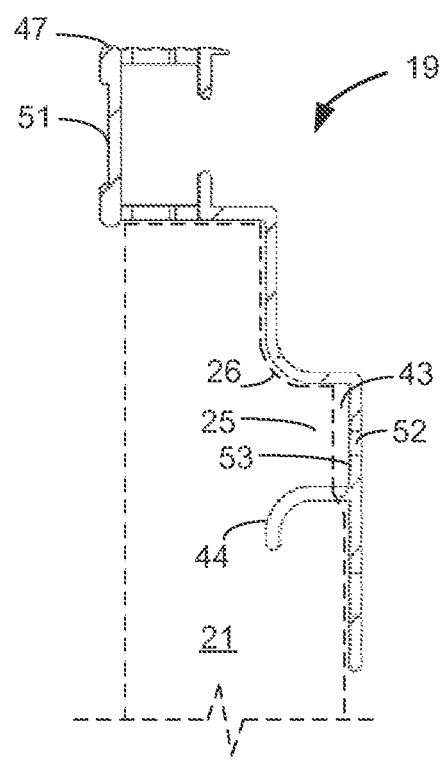
FIG. 7 is an end view of a tail skirt according to an embodiment of the present disclosure.

FIG. 7 is an end view of the tail skirt 19 before it is assembled onto the bumper 20 (FIG. 2). The tail skirt 19 is a one-piece extrusion comprising the groove 25, which is formed by a back tail wall 53, the flange 44, and the upper lip 26. The groove 25 is 1.75 inches deep in one embodiment. The light bar 22 (FIG. 2) is 0.75 inches thick in one embodiment. Therefore, when the light bar 22 is installed into the groove 25, the light bar is still recessed by about 1 inch.

The back tail wall 53 is generally vertical and extends downwardly from the frontmost portion of the upper lip 26. The upper lip 26 curves upwardly from the back tail wall 53 and the flange 44 curves downwardly from the back tail wall 53. A tail rail 51 extends rearwardly from the tail skirt 19.

When the upright 21 (shown in dashed lines) is installed onto the tail skirt 19, the space 43 is created due to the gap between the upright 21 and the back tail wall 53. When the light bar 22 (FIG. 3) is installed, the wiring harness 33 (FIG. 3) passes through the space 43, and then through an opening 52 in the back tail wall 53.

Figure 8:
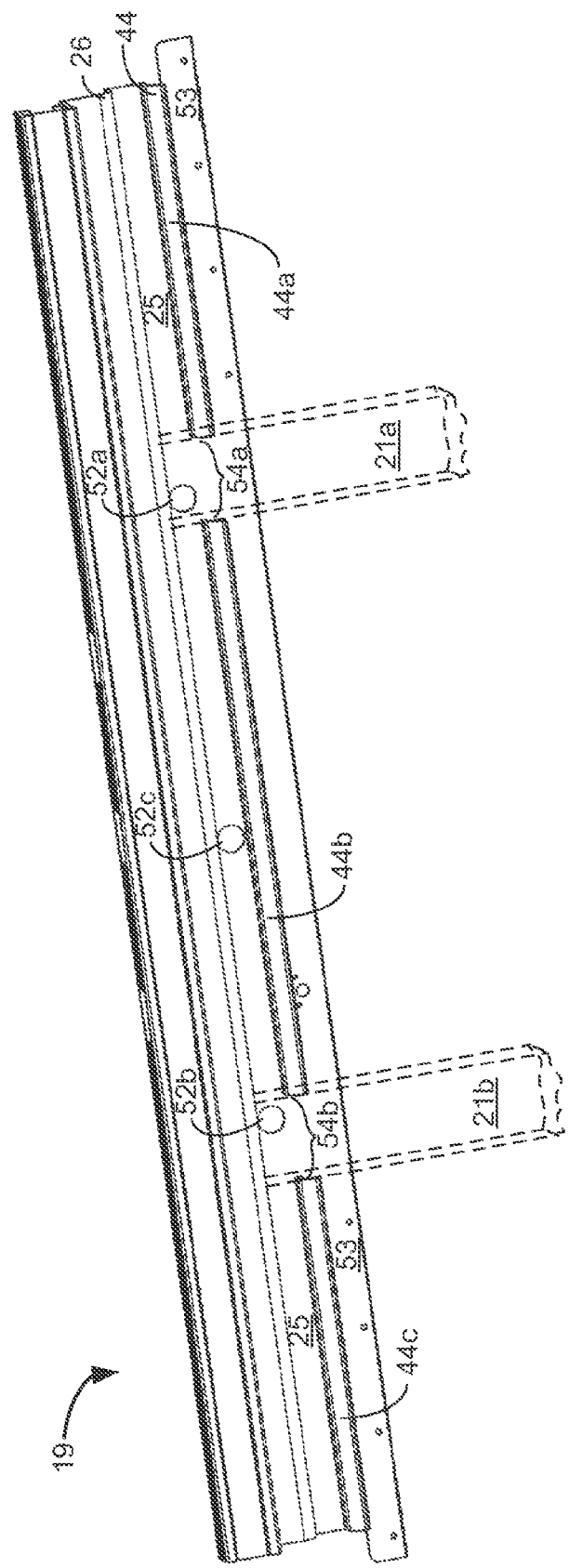
FIG. 8 is a perspective view of the tail skirt of FIG. 7.

FIG. 8 is a perspective view of the tail skirt 19 of FIG. 8 before the tail skirt 19 is assembled onto the bumper 20 (FIG. 2). The flange 44 extends horizontally across the tail skirt 19 after the tail skirt 19 is extruded. Then to prepare the tail skirt 19 for assembly with the uprights 21 (FIG. 2), spaces 54a and 54b are created by removing portions of the flange 44 (down to the back tail wall 53). This removal of portions of the flange 44 results in the flange 44 being split into three portions, a right side flange 44a, a middle flange 44b, and a left side flange 44c.

The uprights 21a and 21b (FIG. 2) are fitted into the spaces 54a and 54b, as shown, and are welded to the tail skirt 19. The uprights 21a and 21b are shown in dashed lines in FIG. 8 for reference.

The tail skirt 19 further comprises openings 52a, 52b, and 52c. The openings 52a-52c extend through the tail skirt 19 and receive wiring (not shown) for the light bars and for a center light (not shown) disposed in the center of the groove 25. Note that the openings 52a and 52b are disposed in the "footprint" that the uprights 21a and 21b, respectively, occupy when the uprights 21a and 21b are installed to the tail skirt 19. This configuration allows the wiring harnesses 33 (FIG. 3) to pass through the tail skirt 19 directly behind the uprights 21a and 21b, thus protecting the wiring harnesses 33 from impact damage.

The embodiments illustrated herein disclose the bumper 20 (FIG. 2) with the light bar 22 (FIG. 2) recessed into the groove 25 (FIG. 2) and with the wiring harness 33 (FIG. 3) received by the space 43 (FIG. 7) behind the uprights 21 and then passing through the opening 52 in the tail skirt 19. In other embodiments, other bumper configurations may be used. For example, the light bar may be installed on a bumper without being fully recessed within a groove. It is understood, therefore, that the invention is not limited to the embodiments illustrated herein, since modifications may be made by those skilled in the art, particularly in light of the foregoing teachings.

What is claimed is:

1. A rear bumper adapted for mounting to a trailer, the rear bumper comprising:
   a tail skirt having a groove formed therein;
   at least one bumper upright bar that perpendicularly intersects the tail skirt and extends downwardly from the tail skirt;
   a light bar recessed and mounted within the groove between the at least one bumper upright and an end of the tail skirt, wherein the light bar comprises a housing, a translucent cover that affixes to the housing, and a plurality of signal lights that shine through the translucent cover in a first direction when illuminated;
   a wiring harness that provides power to the plurality of signal lights;
   said light bar including a translucent protrusion that extends beyond the end of the tail skirt, wherein the protrusion reflects light from at least one of the plurality of signal lights in a second direction that is opposite the first direction.

2. The rear bumper of claim 1, wherein the rear bumper comprises two bumper upright bars extending downwardly from the tail skirt and terminating in a rear step.

3. The rear bumper of claim 2, wherein one or more seals are disposed between the light bar housing and the translucent cover.

4. The rear bumper of claim 1, wherein each of the plurality of signal lights is a light emitting diode (LED).

5. The rear bumper of claim 1, further comprising a space behind the bumper upright and in front of the back tail wall where the bumper upright perpendicularly intersects the tail skirt and an opening formed through the back tail wall and positioned behind the bumper upright and wherein the wiring harness passes through the space and the opening.

6. The rear bumper of claim 5, wherein the wiring harness exits an inner side edge of the light bar.

7. The rear bumper of claim 1, wherein the rear bumper further comprises a second light bar recessed and mounted at a second end of the tail skirt within the groove.

8. The rear bumper of claim 7, wherein the bumper comprises a first bumper upright bar and a second bumper upright bar that each perpendicularly intersects the tail skirt and extends downwardly from the tail skirt, and the second light bar is mounted between the second bumper upright and the second end.

9. The rear bumper of claim 1, wherein the translucent protrusion comprises an angled prism and a forward-facing surface, and light is reflected from the angled prism through the forward-facing surface in the second direction.

10. The rear bumper of claim 9 wherein the translucent protrusion is contiguous with the cover.

11. The rear bumper of claim 1 further comprising a generally horizontal tail rail positioned generally above and extending rearward from the tail skirt.

12. The rear bumper of claim 1 wherein in the groove is defined by a horizontally-extending flange, an upper lip and a generally vertical back tail wall connected between and joining the flange and the upper lip.

* * * * *